(12) United States Patent
Björkman et al.

(10) Patent No.: US 12,346,114 B2
(45) Date of Patent: Jul. 1, 2025

(54) METHOD TO CONTROL A MARINE VESSEL, A CONTROL UNIT AND A VESSEL

(71) Applicant: CPAC SYSTEMS AB, Gothenburg (SE)

(72) Inventors: Simon Björkman, Gothenburg (SE); David Wall, Gothenburg (SE); Lennart Dahlström, Mölnlycke (SE); Oskar Waldemarsson, Gothenburg (SE)

(73) Assignee: CPAC SYSTEMS AB, Gothenburg (SE)

( * ) Notice: Subject to any disclaimer, the term of this patent is extended or adjusted under 35 U.S.C. 154(b) by 162 days.

(21) Appl. No.: 17/999,283

(22) PCT Filed: May 20, 2020

(86) PCT No.: PCT/EP2020/064033
§ 371 (c)(1),
(2) Date: Nov. 18, 2022

(87) PCT Pub. No.: WO2021/233532
PCT Pub. Date: Nov. 25, 2021

(65) Prior Publication Data
US 2023/0195117 A1    Jun. 22, 2023

(51) Int. Cl.
*G05D 1/02* (2020.01)
*B63B 79/40* (2020.01)
(Continued)

(52) U.S. Cl.
CPC ........... *G05D 1/0206* (2013.01); *B63B 79/40* (2020.01); *B63H 25/04* (2013.01);
(Continued)

(58) Field of Classification Search
CPC ...... G05D 1/0206; B63B 79/40; B63H 25/04; B63H 20/12; B63H 2020/003; B63H 2025/026
(Continued)

(56) References Cited

U.S. PATENT DOCUMENTS 7,036,445 B2   5/2006  Kaufmann et al.
2014/0316657 A1  10/2014  Johnson et al.
(Continued)

FOREIGN PATENT DOCUMENTS

WO   2007055605 A1   5/2007
WO   2019231464 A1  12/2019

OTHER PUBLICATIONS

International Search Report and Written Opinion of the International Searching Authority in corresponding International Application No. PCT/EP2020/064033 mailed Mar. 4, 2021 (12 pages).
(Continued)

*Primary Examiner* — Mahmoud S Ismail
(74) *Attorney, Agent, or Firm* — Venable LLP; Jeffri A. Kaminski

(57) ABSTRACT

An operating command indicating a requested vessel direction and plotting a course represented by a reference line for the requested vessel direction from an initial position is registered. It is then monitored if the vessel has deviated from the reference line and if a deviation from the reference line is detected, then a value for current vessel speed is detected. The detected vessel speed value is compared to a predetermined reference speed value to determine if the current vessel speed value is within a high speed interval or a low speed interval relative to the reference speed value. Depending on the determined speed interval the vessel is controlled according a low speed control strategy; or a high speed control strategy in order to move the vessel from a
(Continued)

current vessel heading to the reference line and the requested vessel direction.

12 Claims, 6 Drawing Sheets

(51) Int. Cl.
  *B63H 25/04* (2006.01)
  *G05D 1/00* (2006.01)
  *B63H 20/00* (2006.01)
  *B63H 20/12* (2006.01)
  *B63H 25/02* (2006.01)
(52) U.S. Cl.
  CPC ........ *B63H 2020/003* (2013.01); *B63H 20/12* (2013.01); *B63H 2025/026* (2013.01)
(58) Field of Classification Search
  USPC .......................................................... 701/21
  See application file for complete search history.

(56) References Cited

U.S. PATENT DOCUMENTS

| | | | |
|---|---|---|---|
| 2015/0346730 A1* | 12/2015 | Stephens | .............. G05D 1/0208 |
| | | | 701/530 |
| 2016/0121989 A1 | 5/2016 | Okuda | |
| 2018/0057132 A1* | 3/2018 | Ward | ................... B63H 21/213 |
| 2021/0173413 A1* | 6/2021 | Derginer | ................. B63B 39/00 |
| 2021/0221485 A1* | 7/2021 | Grunewald Mayer | ...................... |
| | | | G05D 1/0206 |

OTHER PUBLICATIONS

International Preliminary Report on Patentability in corresponding International Application No. PCT/EP2020/064033 mailed Sep. 26, 2022 (7 pages).

* cited by examiner

METHOD TO CONTROL A MARINE VESSEL, A CONTROL UNIT AND A VESSEL

CROSS-REFERENCE TO RELATED APPLICATIONS

This application is a U.S. National Stage application of PCT/EP2020/064033, filed May 20, 2020 and published on Nov. 25, 2021, as WO 2021/233532, all of which is hereby incorporated by reference in its entirety.

TECHNICAL FIELD

The present disclosure relates to a method to control a marine vessel travelling in a selected straight line in a forward or backward direction. The disclosure further relates to a control unit and a vessel provided with such a control unit.

BACKGROUND

A vessel moving in a body of water is acted on by currents, wind and other disturbances. When an operator is trying to move the vessel in a straight line forwards or backwards, it is necessary to compensate manually for vessel displacements caused by such disturbances. Manual compensation for vessel displacement is performed by the operator using a suitable controller, such as a joystick or a steering wheel and throttle levers used together. The control strategy to be used by the operator when compensating for these disturbances differs depending on whether the vessel is travelling at high or low speeds. The speed at which a switch between the control strategies should be made will also vary depending on the type of hull and the propulsion layout for individual vessels.

A problem encountered when performing this type of manual compensation to maintain a desired straight line movement is that there is a risk of the operator selecting the wrong control strategy. This problem can occur if the operator is unfamiliar with the vessel and its instrumentation or if the weather conditions are adverse. Should the wrong control strategy be selected then the result can be an unexpected or undesired vessel movement, which would require additional manual compensation.

The object of the invention is to provide an improved method for controlling a marine vessel and a control unit for performing said method that solves the above problems.

SUMMARY

The above problems have been solved by method to control a marine vessel, a control unit and a vessel provided with such a control unit, as claimed in the appended claims.

In the subsequent text, the terms "vessel heading" or "heading" are intended to describe the direction of the longitudinal axis of the vessel in or relative to the direction of travel. For instance, when travelling in the forward direction, the heading is the direction in which the bow of the vessels is pointing. Further, the term "vessel direction" is intended to describe an actual or current direction of travel of the vessel. An alternative term for vessel direction is "course over ground". In calm conditions, with no wind, water current or other disturbances, the vessel direction or course over ground will usually coincide with the vessel heading. However, when subjected to an external disturbance such as a crosswind, the heading may need to be pointed slightly into the wind in order to maintain a desired vessel direction. The term "vessel direction" does not indicate whether the vessel is moving forwards or rearwards. Forward and rearward movement will be denoted by "forward direction of travel" or "rearward direction of travel" or terms to that effect. The term "drive unit" is used to denote both propulsion units for powering the vessel in a forward or rearward direction and bow or lateral thrusters for powering the vessel in the transverse direction. In order to displace the vessel in a diagonal direction, at an angle to the vessel heading a minimum of two drive units is required. Hence, the minimum requirement is a vessel having a single propulsion unit and a single bow thruster or a vessel having two propulsion units.

According to one aspect, the disclosure relates to a method to control a marine vessel comprising two or more drive units. The method involves performing the steps of:
  registering an operating command indicating a requested vessel direction;
  plotting a course represented by a reference line for the requested vessel direction from an initial position; and
  monitoring if the vessel has deviated from the reference line.

The course is plotted from an initial position represented by the position of the vessel at the time when the operating command is received. The position of the vessel is constantly monitored by a Global Navigation Satellite System (GNSS), e.g. a GPS system or similar. The plotted course is drawn virtually on a digital map stored in a control unit used for controlling the vessel during the execution of the method steps. The course is represented by a reference line passing through a central coordinate point of the vessel and extending in the requested vessel direction. The reference line is stored and maintained for the duration of the requested maneuver. The vessel heading can also be monitored by the GNSS, or alternatively by a suitable compass. The operating command received by the control unit will also indicate a requested vessel speed to be maintained during the maneuver.

If a deviation of the vessel from the reference line has been detected, then the subsequent steps are performed:
  detecting a value for current vessel speed;
  comparing the detected vessel speed value to a predetermined reference speed value;
  registering if the current vessel speed value is within a high speed interval or a low speed interval relative to the reference speed value.

Depending on the registered speed interval the method involves either (i) controlling the vessel according to a low speed control strategy; or (ii) controlling the vessel according to a high speed control strategy in order to move the vessel from a current vessel heading to the stored reference line and to resume the requested vessel direction.

The disclosed method aims to perform an automatic switch between high and low speed control strategy depending on a currently detected vessel speed. This allows for an accurate reference line following at all times irrespective of the forward/rearward direction of travel. In the subsequent text, the term "predetermined reference speed" will also be referred to as "predetermined speed". The predetermined speed is dependent on a number of factors. One such factor is the type of hull, that is, if the vessel has a planing hull, a displacement hull or such like. A further factor is the propulsion layout for the individual vessel, that is, if the vessel has a single propulsion unit and a single bow thruster, multiple propulsion units, or a combination of multiple propulsion units and one or more lateral thrusters. The predetermined speed can be determined, for instance, by tests performed by a vessel manufacturer. When values for the predetermined speed in the forward and rearward directions have been established for an individual vessel, values for the predetermined speed are selected. As a rule, the value for the predetermined speed will be lower for the rearward direction. The selected values are set at a level that ensures that the low speed control strategy can be performed even under adverse weather conditions. Values for the predetermined speed can then be stored in a suitable memory in a control unit provided on-board the vessel.

The initial registering of the operating command and the requested vessel direction can be performed in a number of different ways. According to a first example the requested vessel direction is registered in response to an operating command in the form of an input signal from a joystick. The operator can displace the joystick straight forwards or straight rearwards towards a desired angle to generate a signal that is transmitted to the control unit. The control unit will then issue a command to engage the drive units at a speed proportional to the angular displacement of the joystick. At the same time the control unit registers the requested vessel direction and initiates vessel control according to the method.

According to a first example the requested vessel direction is registered in response to an operating command in the form of an input signal from a graphical user interface (GUI). The operator can draw a straight line or indicate a destination on a touch sensitive screen or similar interface to generate a signal that is transmitted to the control unit. The vessel speed can be set to a default value or be selected by the operator. For instance, when maneuvering the vessel in a marina, speed restrictions will apply and may be used as a default value. Following the input from the GUI the control unit registers the requested vessel direction and initiates vessel control according to the method.

According to a first example the requested vessel direction is registered in response to an operating command in the form of an input signal indicating auto-pilot actuation, following operation of a throttle controller and a helm or steering wheel. The operator can initiate operation of the vessel in a desired direction and at a desired speed. Following auto-pilot actuation the control unit registers the requested vessel direction and initiates vessel control according to the method.

The deviation of the vessel from the reference line and the requested vessel direction can be detected in a number of different ways. The deviation is preferably monitored constantly in order to determine that a deviation has occurred in real time. However, intermittent monitoring at intervals of one or more seconds is also possible. According to a first example, the method involves monitoring if a current vessel position has deviated from the reference line. The deviation is measured at right angles from the reference line plotted on the digital map to a position represented by the central coordinate point of the vessel. The control unit calculates the current distance and its direction (right or left) relative to the reference line using the reference line and the current vessel position received from a GNSS. When the calculated current distance to the right or the left of the reference line is greater than zero then a deviation has occurred.

According to a second example, the method involves monitoring if the current vessel heading has deviated from the requested vessel direction. In this example, the deviation is a current angle measured from the reference line plotted on the digital map to a line represented by the current vessel heading. The control unit calculates the current angle using the reference line and the current vessel heading received from a GNSS or a compass. When the calculated current angle to the right or the left of the reference line is greater than zero then a deviation has occurred. A combination of the above examples is also possible, wherein a deviation from the reference line is deemed to have occurred when any one of the values for distance or angle exceeds zero.

If a deviation from the reference line has occurred, then the control unit will register whether the current vessel speed value is within a high speed interval or a low speed interval relative to the stored reference speed value.

If the current vessel speed value is equal to or below the stored reference speed value, then a low speed control strategy is selected. In this case, the method involves adjusting the current vessel heading and maintaining an adjusted vessel heading parallel to the reference line and the requested vessel direction. Subsequently, the two or more drive units are controlled to displace the vessel along a diagonal course at the adjusted vessel heading towards the reference line. The method further involves maintaining the requested vessel speed within the low speed interval until the current vessel heading coincides with the requested vessel direction on the reference line. Preferably, the initially requested vessel speed is maintained while performing the low speed control strategy.

If the current vessel speed value is above the stored reference speed value, then a high speed control strategy is selected. In this case, the method involves determining heading adjustments required for reaching the reference line and the requested vessel direction. Subsequently, the two or more drive units are controlled to steer the vessel along a course from the current vessel heading along a variable heading towards the reference line. In this case, the vessel heading is allowed to change during the maneuver, as the maximum available transverse propulsive thrust from the drive units is insufficient for maintaining a heading parallel to the reference line at the current vessel speed. The method further involves maintaining the requested vessel speed within the high-speed interval until the current vessel heading coincides with the requested vessel direction on the reference line. Preferably, the initially requested vessel speed is maintained while performing the high speed control strategy.

According to a second aspect, the disclosure relates to a control unit arranged to control a marine vessel comprising two or more drive units during straight line travel. The control unit comprises processing circuitry being configured to receive an input indicating at least a requested vessel direction along a reference line representing a plotted course. Such an input will inherently also indicate a requested vessel speed. The processing circuitry is configured to detect an operator command indicating a requested vessel direction and to plot a course represented by a reference line for the requested vessel direction. The processing circuitry will then monitor if a current vessel heading has deviated from the reference line.

If a deviation from the reference line is detected, the processing circuitry is further configured to detect a value for current vessel speed; to compare the detected vessel speed value to a predetermined reference speed value; and to register if the current vessel speed value is within a high speed interval or a low speed interval relative to the reference speed value. Depending on which speed interval that has been registered the control unit is arranged to control the vessel according a low speed control strategy or a high speed control strategy.

When a low speed control strategy has been registered the two or more drive units are controlled by the control unit to displace the vessel along a diagonal course at the adjusted vessel heading towards the reference line. The control unit will maintain the current vessel speed within the low speed interval until the current vessel heading coincides with the requested vessel direction on the reference line. Preferably, the initially requested vessel speed is maintained while performing the low speed control strategy.

When a high speed control strategy has been registered the two or more drive units are controlled by the control unit to steer the vessel along a course from the current vessel heading along a variable heading towards the reference line. In this case, the vessel heading is allowed to change during the maneuver, as the maximum available transverse propulsive thrust from the drive units is insufficient for maintaining a heading parallel to the reference line at the current vessel speed. The control unit will maintain the current vessel speed within the high speed interval until the current vessel heading coincides with the requested vessel direction on the reference line. Preferably, the initially requested vessel speed is maintained while performing the high speed control strategy.

According to a third aspect, the disclosure relates to a marine vessel, wherein the marine vessel comprises a control unit as described above.

According to a fourth aspect, the disclosure relates to a computer program comprising program code means for performing the method according to the above-mentioned examples when said program is run on a computer.

According to a fifth aspect, the disclosure relates to a computer program product comprising program code means stored on a computer readable medium for performing the method according to the above-mentioned examples when said program product is run on a computer.

An advantage of the invention is that a requested straight line movement can be maintained automatically without requiring manual compensation or intervention from the operator. This facilitates operation of the vessel under adverse weather conditions or if the operator is unfamiliar with the vessel and its instrumentation. If the vessel deviates from a requested course, the control method will ensure that the appropriate control strategy is selected irrespective of the current vessel speed. This eliminates the risk of an unexpected or undesired vessel movement which could occur if the wrong control strategy is selected.

BRIEF DESCRIPTION OF THE DRAWINGS

In the following text, the invention will be described in detail with reference to the attached drawings. These schematic drawings are used for illustration only and do not in any way limit the scope of the invention. In the drawings.

DETAILED DESCRIPTION OF EXAMPLE EMBODIMENTS OF THE INVENTION

Figure 1:
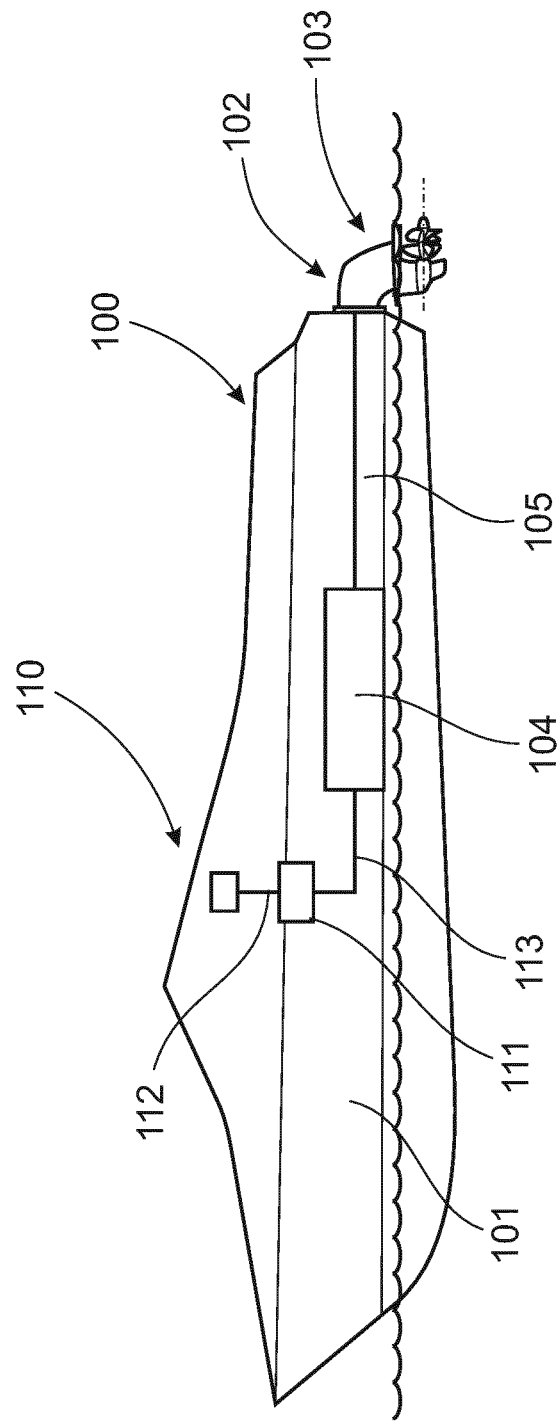
FIG. 1 shows a schematically illustrated marine vessel.

FIG. 1 shows a side view of a schematically illustrated marine vessel 100 comprising a hull 101 and a pair of marine propulsion units 102, 103 mounted to a transom on the vessel 100. The marine propulsion units 102, 103 are each powered by a driveline comprising a corresponding engine 104 and a transmission 105 (one shown). The example in FIG. 1 shows two propulsion units driven by inboard engines. Alternative arrangements includes, for instance, two or more outboard engines, a single propulsion unit combined with a bow thruster 106 (indicated in dashed lines), or two or more azimuthing pods arranged under the hull of the vessel. The engines can of course be replaced by electric motors using battery packs or fuel cells, or engines operated on alternative fuels. According to the disclosure, at least two drive units are required for maneuvering the vessel.

The marine propulsion units 102, 103 are controllable by a control means such as a joystick 110 located at an operating position. The joystick 110 is connected to an electronic control unit (ECU) 111 via suitable wiring 112, which ECU 111 is connected to the driveline 104, 105 via additional wiring 113. Alternative control means includes a graphical user interface (GUI), such as a touch sensitive display, or manual controls comprising throttle levers and a steering wheel.

Figure 2:
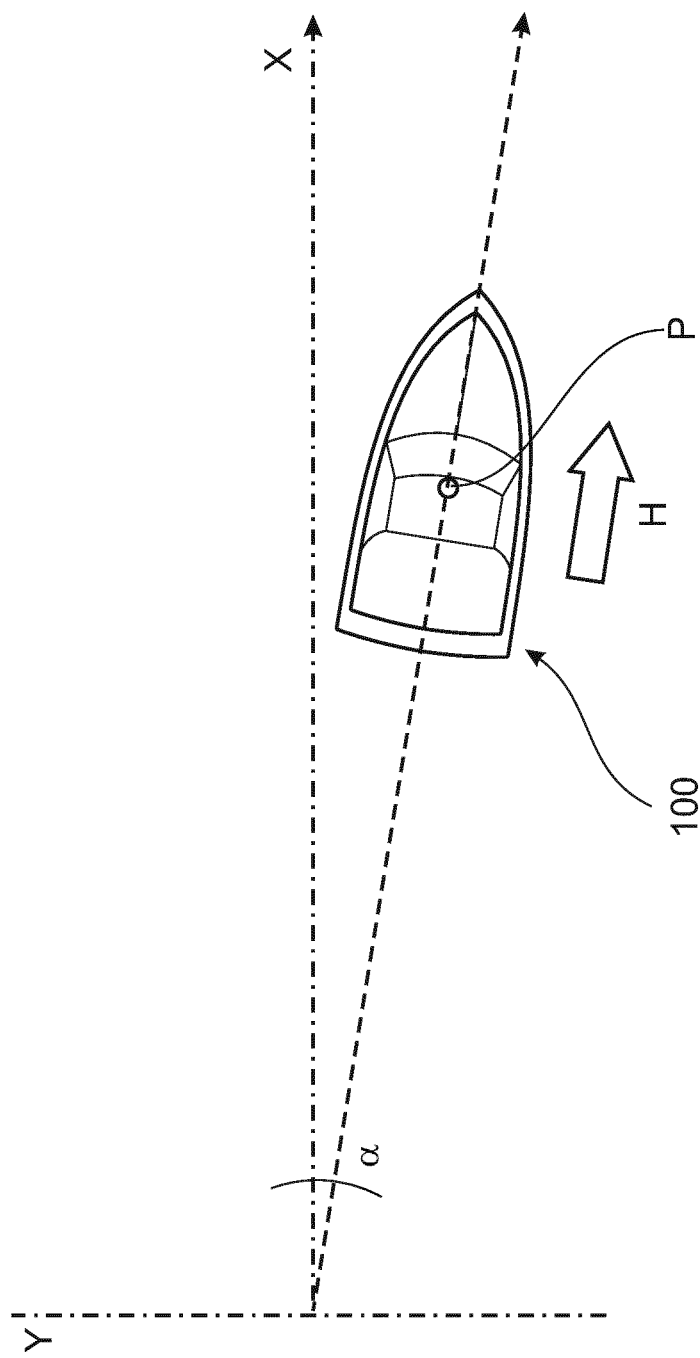
FIG. 2 shows the marine vessel placed in a reference system.

FIG. 2 shows a vessel 100 placed in a reference system which will be referred to in the subsequent text. In FIG. 2, the X-axis indicates a requested direction of travel for the vessel, while the Y-axis indicates a transverse deviation from the X-axis. The X- and Y-axes are indicated in dash-dotted lines. The vessel 100 in FIG. 2 is shown travelling at a heading H away from the X-axis. The current heading follows a course indicated by a dashed line arranged at an angle α from the X-axis and passing through a central coordinate point P of the vessel 100.

Figure 3:
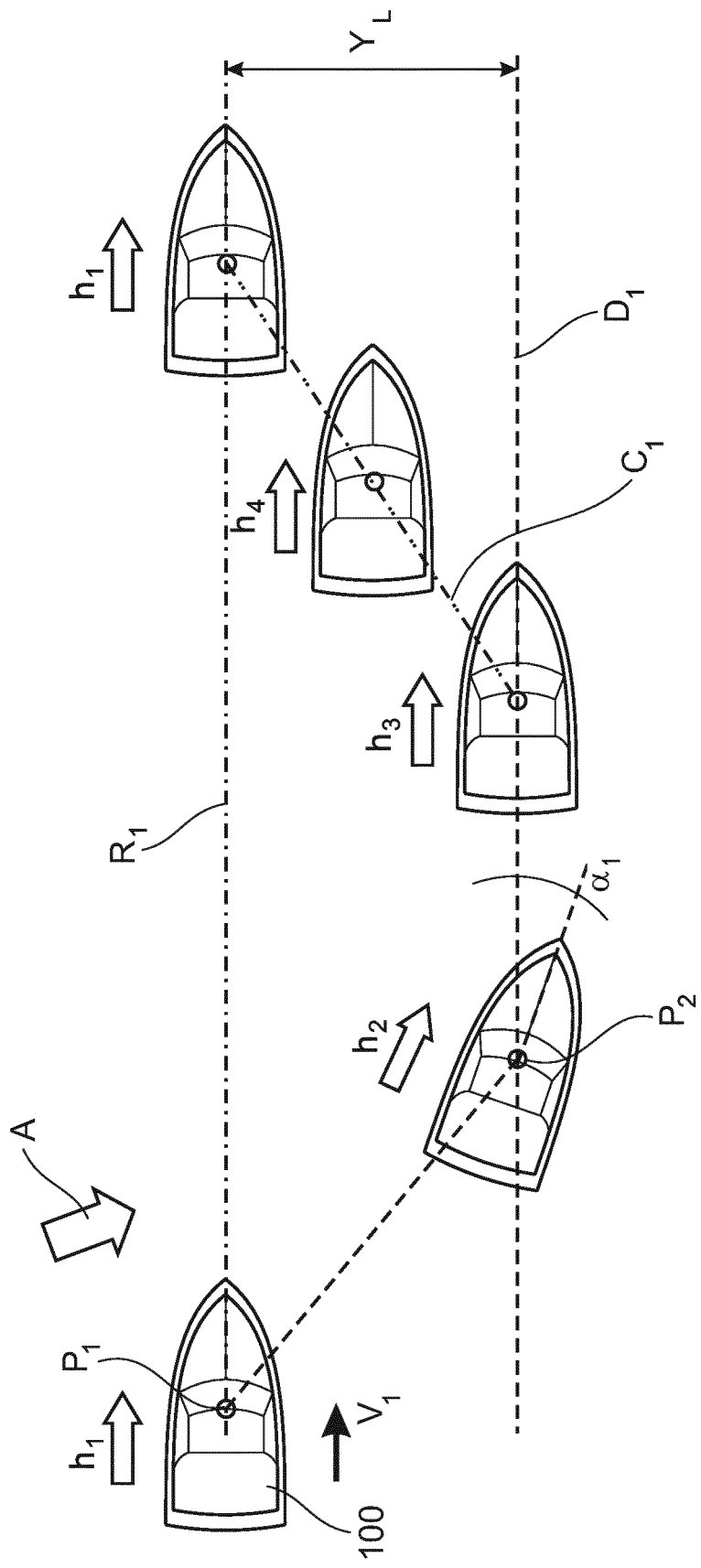
FIG. 3 shows the marine vessel maneuvered according to a first control strategy.

FIG. 3 shows the marine vessel being maneuvered according to a first control strategy. The control unit 111 (shown in FIG. 1) comprises processing circuitry being configured to receive an input from the joystick 110 indicating a requested vessel direction $h_1$ along a virtual reference line representing a plotted course. Such an input will inherently also indicate a requested vessel speed $V_1$. The processing circuitry in the control unit is configured to detect the operator command indicating a requested vessel direction $h_1$ and to plot a course represented by a reference line $R_1$ for the requested vessel direction $h_1$. The control unit will further control the propulsion units to bring the vessel up to the requested vessel speed $V_1$. The processing circuitry will then monitor if a current vessel heading $h_2$ has deviated from the reference line $R_1$. A deviation can be caused, for instance, by a crosswind A pushing the vessel 100 away from the requested vessel direction $h_1$. According to a first example, the deviation is determined as a distance $Y_L$ measured in the transverse direction relative to the reference line $R_1$ (see FIG. 2; Y-axis). A deviation is deemed to have occurred when it is detected that the central coordinate point of the vessel has moved from a first position $P_1$ to a second position $P_2$, wherein the transverse distance $Y_L$ between the reference line is greater than zero. According to a second example, the deviation is determined as an angle (see FIG. 2; angle α) between the reference line $R_1$ and the current heading $h_2$ of the vessel. A deviation is deemed to have occurred when it is detected that the angle di is greater than zero. Alternatively, the processing circuitry can be arranged to monitor both the transverse distance and the angle.

When a deviation from the reference line $R_1$ is detected, the processing circuitry is configured to detect a value for current vessel speed, which in this example is assumed to be equal to the requested vessel speed $V_1$. This is usually the case when the vessel is only subjected to a crosswind or a cross-current. The current vessel speed $V_1$ is compared to a stored predetermined reference speed value $V_{ref}$ stored in the control unit. In the example shown in FIG. 3, the current vessel speed $V_1$ is lower than the reference speed value $V_{ref}$. The control unit will then register that the current vessel speed value is within a low speed interval relative to the reference speed value $V_{ref}$. Subsequently, the control unit is arranged to control the vessel according the low speed control strategy in order to bring it back to the requested vessel direction $h_1$ along the reference line $R_1$. This may require an initial displacement controlling the drive units to move the vessel to an adjusted vessel heading $h_3$ that is parallel to the reference line $R_1$. The drive units are then controlled to displace the vessel along a diagonal course $C_1$ at the adjusted vessel heading $h_3$ towards the reference line $R_1$. The control unit will control the current vessel speed up or down in order to maintain the requested vessel speed $V_1$ within the low speed interval until the current vessel heading $h_4$ coincides, that is, is parallel with the requested vessel direction $h_1$ on the reference line $R_1$. Preferably, the initially requested vessel speed $V_1$ is maintained while performing the low speed control strategy. The transverse distance and/or the angle are constantly monitored as the vessel is controlled towards the originally requested vessel direction $h_1$ on the reference line $R_1$.

Figure 4:
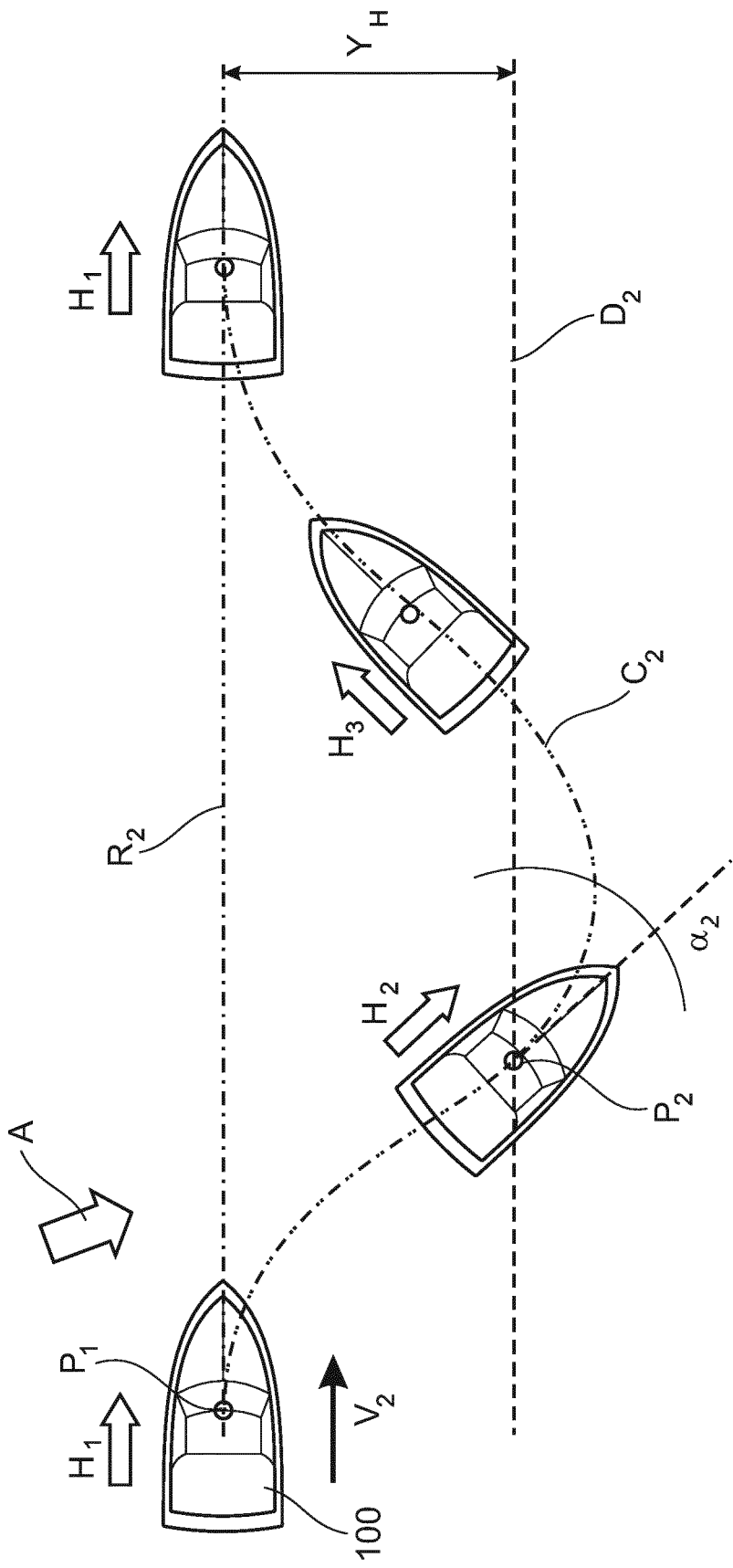
FIG. 4 shows the marine vessel maneuvered according to a second control strategy.

FIG. 4 shows the marine vessel being maneuvered according to a second control strategy. In the same way as described above, the control unit comprises processing circuitry being configured to receive an input from the joystick indicating a requested vessel direction $H_1$ along a virtual reference line representing a plotted course. Such an input will inherently also indicate a requested vessel speed $V_2$. The processing circuitry in the control unit is configured to detect the operator command indicating a requested vessel direction $H_1$ and to plot a course represented by a reference line $R_2$ for the requested vessel direction $H_1$. The control unit will further control the propulsion units to bring the vessel up to the requested vessel speed $V_2$. The processing circuitry will then monitor if a current vessel heading $H_2$ has deviated from the reference line $R_2$. A deviation can be caused, for instance, by a crosswind A pushing the vessel 100 away from the requested vessel direction $H_1$. According to a first example, the deviation is determined as a distance $Y_H$ measured in the transverse direction relative to the reference line $R_2$ (see FIG. 2; Y-axis). A deviation is deemed to have occurred when it is detected that the central coordinate point of the vessel has moved from a first position $P_1$ to a second position $P_2$, wherein the transverse distance $Y_H$ between the reference line is greater than zero. According to a second example, the deviation is determined as an angle (see FIG. 4; angle $\alpha_2$) between the reference line $R_2$ and the current heading $H_2$ of the vessel. A deviation is deemed to have occurred when it is detected that the angle $\alpha_2$ is greater than zero. Alternatively, the processing circuitry can be arranged to monitor both the transverse distance and the angle. The direction of the deviation relative to the reference line is also determined.

When a deviation from the reference line $R_2$ is detected, the processing circuitry is configured to detect a value for current vessel speed, which in this example is assumed to be equal to the requested vessel speed $V_2$. This is usually the case when the vessel is only subjected to a crosswind or a cross-current. The current vessel speed $V_2$ is compared to a stored predetermined reference speed value $V_{ref}$ stored in the control unit. In the example shown in FIG. 4, the current vessel speed $V_2$ is higher than the reference speed value $V_{ref}$. The control unit will then register that the current vessel speed value is within a high speed interval relative to the reference speed value $V_{ref}$. Subsequently, the control unit is arranged to control the vessel according the high speed control strategy in order to bring it back to the requested vessel direction $H_1$ along the reference line $R_1$. The two or more drive units are controlled by the control unit to steer the vessel along a course $C_2$ turning the vessel from the current vessel heading $H_2$ along a trajectory having a variable heading $H_3$ towards the reference line $R_2$. In this case, the vessel heading is allowed to change during the maneuver, as the maximum available transverse propulsive thrust from the drive units is insufficient for maintaining a heading parallel to the reference line at the current vessel speed. The control unit will maintain the requested vessel speed $V_2$ within the high-speed interval until the current, variable vessel heading $H_3$ coincides with the requested vessel direction $H_1$ on the reference line. Preferably, the initially requested vessel speed $V_2$ is maintained while performing the high-speed control strategy. The transverse distance and/or the angle are constantly monitored as the vessel is controlled to attain the originally requested vessel direction $H_1$ on the reference line $R_1$.

Figure 5:
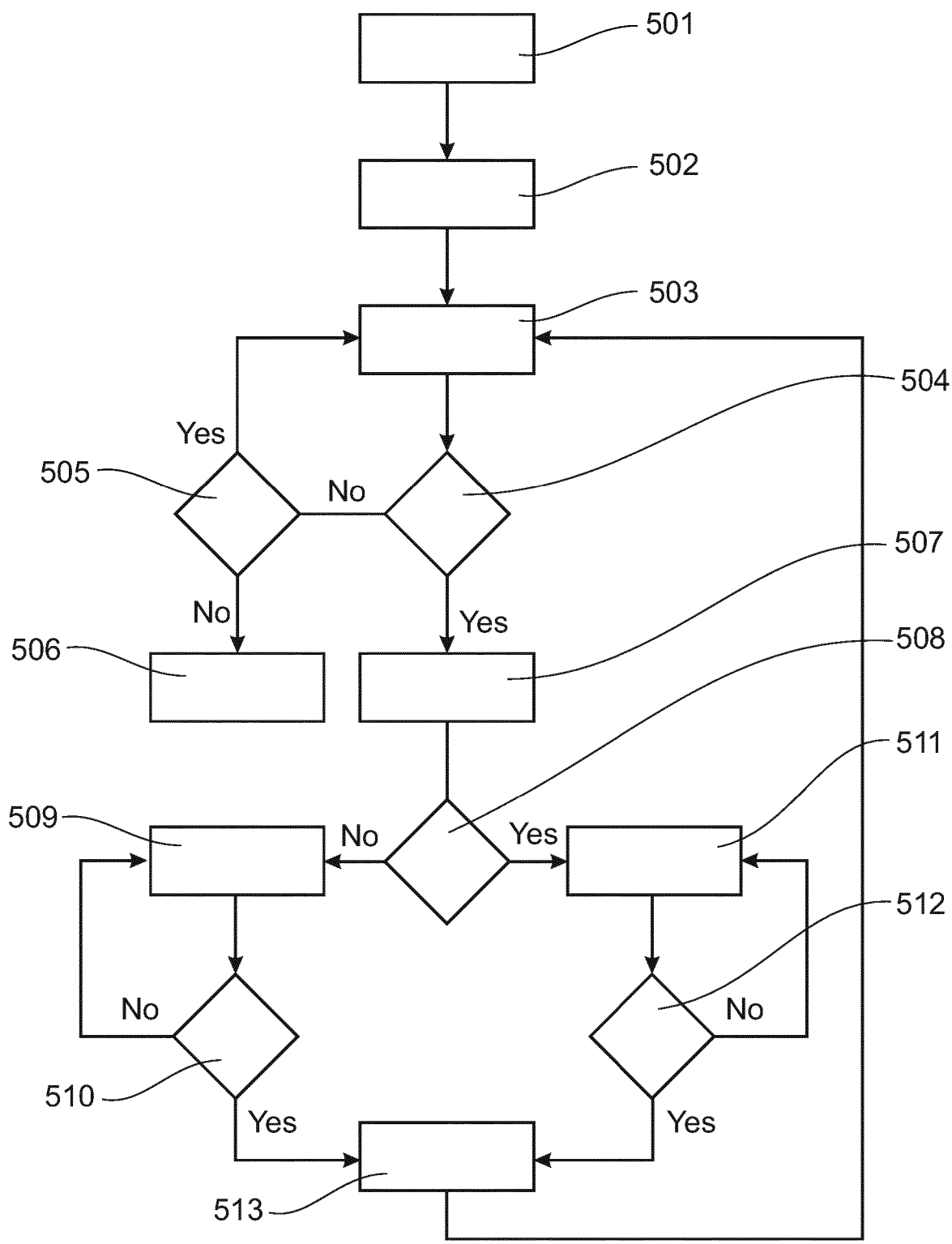
FIG. 5 shows a flow chart illustrating a method for controlling the vessel.

FIG. 5 shows a flow chart illustrating a method for controlling the vessel. The method involves controlling a marine vessel comprising two or more drive units travelling in a straight line on a requested course. In a first step 501 the method involves registering an operating command indicating a requested vessel direction and vessel speed. The operating command can be an input signal from a joystick, GUI, a helm and throttle lever, or similar transmitted to a control unit. In a second step 502 a course is plotted, which course is represented by a reference line for the requested vessel direction from an initial position. The course is plotted from an initial position represented by the position of the vessel at the time when the operating command is received. The position of the vessel is constantly monitored by a Global Navigation Satellite System (GNSS), e.g. a GPS system or similar. The plotted course is drawn virtually on a digital map stored in a control unit used for controlling the vessel during the execution of the method steps. The course is represented by a reference line passing through a central coordinate point of the vessel and extending in the requested vessel direction. The reference line is stored and maintained for the duration of the requested maneuver. The vessel heading can also be monitored by the GNSS, or alternatively by a suitable compass.

In a third step 503, the method involves monitoring if the vessel has deviated from the reference line. According to a first example this step involves detecting if a current vessel position has deviated in the transverse distance from the reference line. The transverse distance is measured at right angles from the reference line plotted on the digital map to a position represented by the central coordinate point of the vessel. According to a second example, the method involves monitoring if the current vessel heading has deviated at an angle away from the requested vessel direction. The angle is measured from the reference line plotted on the digital map to line represented by the current vessel heading. Alternatively, both the distance and the angle can be monitored.

In a fourth step 504 it is determined if a deviation of the vessel from the reference line has occurred-. The deviation is determined by monitoring if a current vessel position has deviated a transverse distance from the reference line. Alternatively, the deviation is determined by monitoring if the current vessel heading has deviated an angle from the requested vessel direction. If it is determined that a deviation has not occurred, the method proceeds to a fifth step 505 where the control unit checks if the straight-line operating command is still valid. If the operating command has been cancelled, then the process is ended in a sixth step 506. If the operating command is maintained, then the process returns to the third step 503 and continues monitoring the transverse distance or the angle during the progress of the vessel. According to an alternative example, the method can involve monitoring both the transverse distance and the angle.

If it is determined that a deviation has occurred, the method proceeds to a seventh step 507 where the control unit detects a value for current vessel speed. In an eight step 508 the method compares the detected vessel speed value to a predetermined reference speed value. The predetermined reference speed value used for this step is also dependent on the direction of travel of the vessel. Depending on the outcome of the comparison, the method registers if the current vessel speed value is within a high speed interval or a low speed interval relative to the reference speed value.

If the current vessel speed value is equal to or below the stored reference speed value, then a low speed control strategy is selected and registered. The method then proceeds to a ninth step 509 wherein the vessel is controlled according to a low speed control strategy in order to move the vessel from a current vessel heading towards the stored reference line and to resume the requested vessel direction. In this case, the method involves monitoring the deviation and adjusting the current vessel heading, if necessary, and maintaining an adjusted vessel heading parallel to the reference line and the requested vessel direction. Subsequently, the two or more drive units are controlled to displace the vessel along a diagonal course at the adjusted vessel heading towards the reference line. The current vessel speed is maintained within the low speed interval while the vessel is displaced towards the requested vessel direction on the reference line. Preferably, the initially requested vessel speed is maintained while performing the low speed control strategy. In a tenth step 510 the method checks whether the straight-line operating command has been cancelled or not. If this is not the case, then the method returns to the ninth step 509 for continued monitoring of the deviation and control of the vessel towards the reference line. If the straight-line operating command has been cancelled, then the process is ended in a thirteenth step 513.

If the current vessel speed value is above the stored reference speed value, then a high-speed control strategy is selected and registered. The method then proceeds to an eleventh step 511 wherein the vessel is controlled according to a high speed control strategy in order to move the vessel from a current vessel heading to the stored reference line and to resume the requested vessel direction. In this case, the method involves monitoring the deviation and determining heading adjustments required for reaching the reference line and the requested vessel direction. Subsequently, the two or more drive units are controlled to steer the vessel along a course from the current vessel heading along a variable heading towards the reference line. In this case, the vessel heading is allowed to change during the maneuver. The current vessel speed is maintained within the high-speed interval while the current vessel heading changes towards the requested vessel direction on the reference line. Preferably, the initially requested vessel speed is maintained while performing the high speed control strategy. In a twelfth step 512 the method checks whether the straight-line operating command has been cancelled or not. If this is not the case, then the method returns to the eleventh step 511 for continued monitoring of the deviation and control of the vessel towards the reference line. If the straight-line operating command has been cancelled, then the process is ended in a thirteenth step 513.

Figure 6:
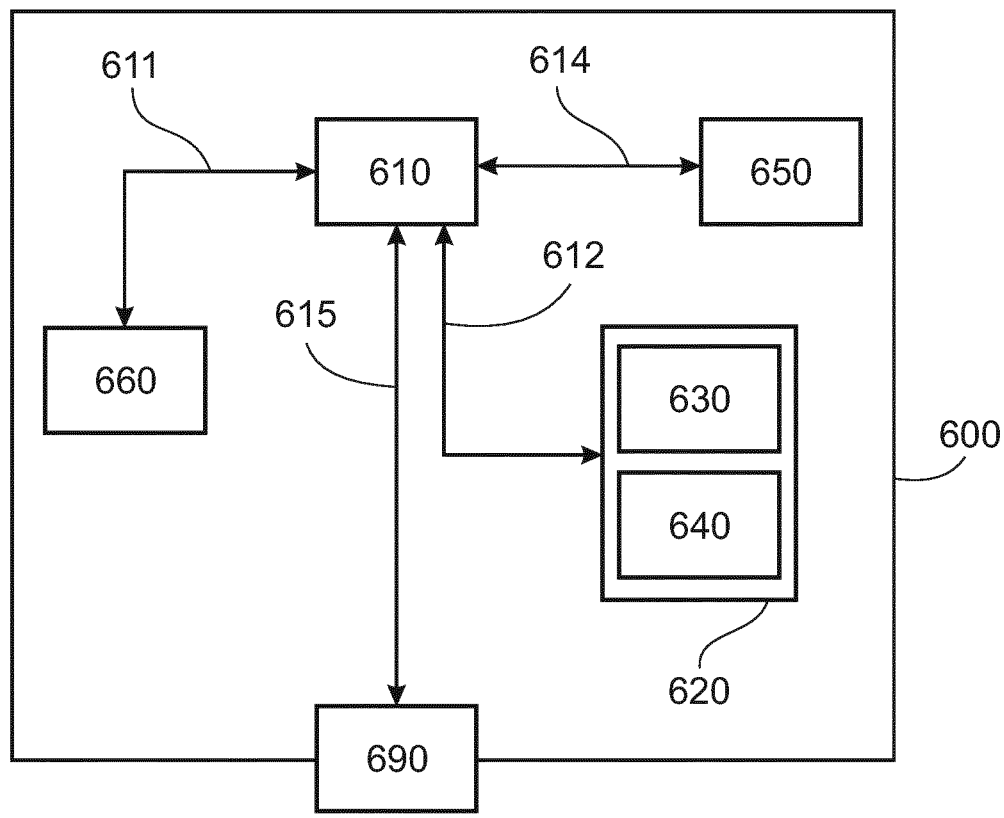
FIG. 6 shows the method applied on a computer arrangement.

The present disclosure also relates to a computer program, and a computer program product to be used with a computer for executing the method as described in any one of the above examples. FIG. 6 shows the method described in connection with FIG. 5 applied on a computer arrangement.

FIG. 6 shows an apparatus 600 according to the present disclosure, comprising a non-volatile memory 620, a processor 610 and a read-write memory 660. The memory 620 has a first memory part 630, in which a computer program for controlling the apparatus 600 is stored. The computer program in the memory part 630 for controlling the apparatus 600 can be an operating system. The apparatus 600 can be enclosed in, for example, a control unit, such as the control unit 111 in FIG. 1. The data-processing unit 610 can comprise, for example, a microcomputer. The memory 620 also has a second memory part 640, in which a program for controlling the marine vessel travelling in a selected straight line in a forward or backward direction according to the invention is stored. In an alternative embodiment, the program for controlling the marine vessel is stored in a separate non-volatile storage medium 650 for data, such as, for example, a CD or an exchangeable semiconductor memory. The program can be stored in an executable form or in a compressed state.

When it is stated below that the data-processing unit 610 runs a specific function, it should be clear that the data-processing unit 610 is running a specific part of the program stored in the memory 640 or a specific part of the program stored in the non-volatile storage medium 650. The data-processing unit 610 is tailored for communication with the storage memory 650 through a data bus 614. The data-processing unit 610 is also tailored for communication with the memory 620 through a data bus 612. In addition, the data-processing unit 610 is tailored for communication with the memory 660 through a data bus 611. The data-processing unit 610 is also tailored for communication with a data port 690 by the use of a data bus 615.

The method according to the present disclosure can be executed by the data-processing unit 610, by the data-processing unit 610 running the program stored in the memory 640 or the program stored in the non-volatile storage medium 650.

The present disclosure should not be deemed to be limited to the embodiments described above, but rather a number of further variants and modifications are conceivable within the scope of the following patent claims.

The invention claimed is:

1. A method to control a marine vessel comprising two or more drive units; the method involving the steps of:
registering an operating command indicating a requested vessel direction;
plotting a course represented by a reference line for the requested vessel direction from an initial position;
monitoring if the vessel has deviated from the reference line; and if a deviation from the reference line is detected;
detecting a value for current vessel speed;
comparing the detected vessel speed value to a predetermined reference speed value;
registering if the current vessel speed value is within a high speed interval or a low speed interval relative to the reference speed value, and depending on the registered speed interval;

i) controlling the vessel according a low speed control strategy; or
ii) controlling the vessel according a high speed control strategy; in order to move the vessel from a current vessel heading to the reference line and the requested vessel direction,
said controlling of the vessel according to a low speed control strategy comprises wherein the low speed control strategy has been selected:
   adjusting the current vessel heading and maintaining an adjusted vessel heading parallel to the reference line and the requested vessel direction; and
   controlling the two or more drive units to displace the vessel along a diagonal course at the adjusted vessel heading towards the reference line.

2. The method according to claim 1, involving monitoring if a current vessel position has deviated from the reference line in the transverse direction.

3. The method according to claim 1, comprising monitoring if the current vessel heading has deviated from the requested vessel direction.

4. The method according to claim 1, comprising registering the requested vessel direction in response to an input signal from a joystick.

5. The method according to claim 1, comprising registering the requested vessel direction in response to an input signal from a graphical user interface.

6. The method according to claim 1, comprising registering the requested vessel direction in response to an input signal indicating auto-pilot actuation from a throttle and a helm.

7. The method according to claim 1, comprising maintaining the current vessel speed within the low speed interval until the current vessel heading coincides with the requested vessel direction on the reference line.

8. The method according to claim 1, wherein the deviation from the reference line is detected by a Global Navigation Satellite System.

9. The method according to claim 1, wherein the vessel heading is determined by a compass or a Global Navigation Satellite System.

10. A control unit arranged to control a marine vessel during straight line travel, the vessel comprising two or more drive units, the control unit comprising processing circuitry, the processing circuitry being configured to receive an input indicating a requested vessel direction along a reference line representing a plotted course, the processing circuitry is configured to:
   detect an operator command indicating a requested vessel direction;
   plot a course represented by a reference line for the requested vessel direction;
   monitor if a current vessel heading has deviated from the reference line; and if a deviation from the reference line is detected, the processing circuitry is further configured to:
   detect a value for current vessel speed;
   compare the detected vessel speed value to a predetermined reference speed value;
   register if the current vessel speed value is within a high speed interval or a low speed interval relative to the reference speed value, and depending of the registered speed interval;
   i) control the vessel according a low speed control strategy; or
   ii) control the vessel according a high speed control strategy;
   in order to move the vessel from the current vessel heading to the reference line for the requested vessel direction,
   wherein said controlling of the vessel according to a low speed control strategy comprises:
   adjusting the current vessel heading and maintaining an adjusted vessel heading parallel to the reference line and the requested vessel direction; and
   controlling the two or more drive units to displace the vessel along a diagonal course at the adjusted vessel heading towards the reference line.

11. Marine vessel, wherein the marine vessel comprises a control unit arranged to control a marine vessel during straight line travel, the vessel comprising two or more drive units, the control unit comprising processing circuitry, the processing circuitry being configured to receive an input indicating a requested vessel direction along a reference line representing a plotted course, the processing circuitry is configured to:
   detect an operator command indicating a requested vessel direction;
   plot a course represented by a reference line for the requested vessel direction;
   monitor if a current vessel heading has deviated from the reference line; and if a deviation from the reference line is detected, the processing circuitry is further configured to:
   detect a value for current vessel speed;
   compare the detected vessel speed value to a predetermined reference speed value;
   register if the current vessel speed value is within a high speed interval or a low speed interval relative to the reference speed value, and depending of the registered speed interval;
   i) control the vessel according a low speed control strategy; or
   ii) control the vessel according a high speed control strategy;
   in order to move the vessel from the current vessel heading to the reference line for the requested vessel direction,
   wherein said controlling of the vessel according to a low speed control strategy comprises:
   adjusting the current vessel heading and maintaining an adjusted vessel heading parallel to the reference line and the requested vessel direction; and
controlling the two or more drive units to displace the vessel along a diagonal course at the adjusted vessel heading towards the reference line.

12. A non-transitory computer program product comprising program code stored on a computer readable medium for performing, when said program code is run on a computer, a method:
   registering an operating command indicating a requested vessel direction;
   plotting a course represented by a reference line for the requested vessel direction from an initial position;
   monitoring if the vessel has deviated from the reference line; and if a deviation from the reference line is detected;
   detecting a value for current vessel speed;
   comparing the detected vessel speed value to a predetermined reference speed value;
   registering if the current vessel speed value is within a high speed interval or a low speed interval relative to the reference speed value, and depending on the registered speed interval;

i) controlling the vessel according a low speed control strategy; or
ii) controlling the vessel according a high speed control strategy; in order to move the vessel from a current vessel heading to the reference line and the requested vessel direction, said controlling of the vessel according to a low speed control strategy comprises wherein the low speed control strategy has been selected:
   adjusting the current vessel heading and maintaining an adjusted vessel heading parallel to the reference line and the requested vessel direction; and controlling the two or more drive units to displace the vessel along a diagonal course at the adjusted vessel heading towards the reference line.

* * * * *